UNITED STATES PATENT OFFICE.

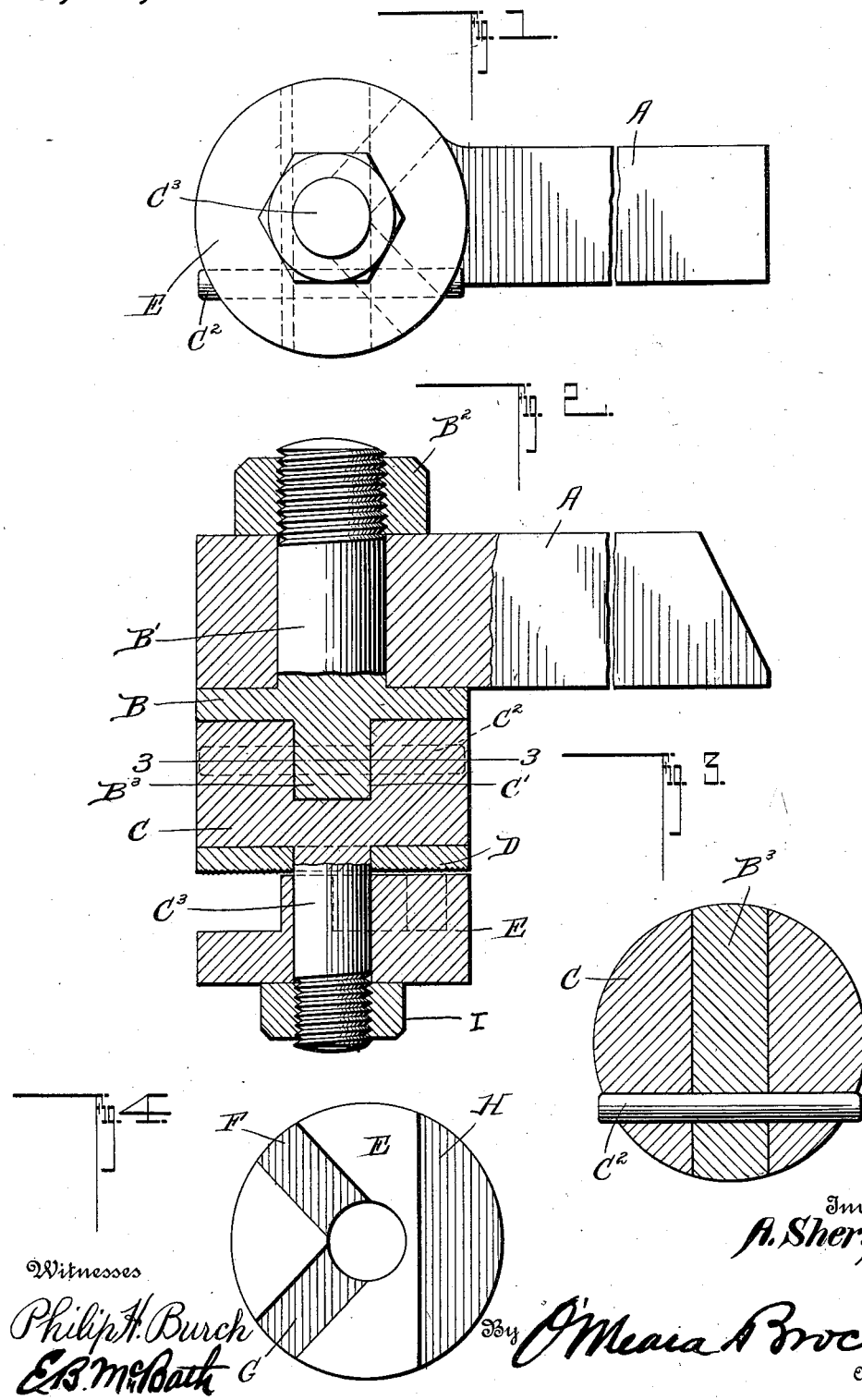

ALBERT SHERIFF, OF COVINGTON, KENTUCKY.

TOOL-HOLDER.

1,022,511.　　　　Specification of Letters Patent.　　Patented Apr. 9, 1912.

Application filed February 15, 1910. Serial No. 544,003.

*To all whom it may concern:*

Be it known that I, ALBERT SHERIFF, a citizen of the United States, residing in Covington, in the county of Kenton and State of Kentucky, have invented a new and useful Improvement in a Tool-Holder, of which the following is a specification.

This invention relates to certain new and useful improvements in tool holders for planing machines and more particularly to undercut tool holders, the object being to provide a tool holder which is so constructed that a tool can be clamped therein easily and quickly and one in which the angle of the tool can be readily adjusted.

A further object of the invention is to provide a tool holder which is exceedingly simple and cheap in construction and one in which the parts are so connected that all danger of the parts working loose when the holder is in operation is prevented.

With these various objects in view, my invention consists in the novel features of construction, combination and arrangement of parts hereinafter fully described, pointed out in the claim and shown in the accompanying drawings, in which, Figure 1 is a front view of my improved tool holder. Fig. 2 is a longitudinal section through the same. Fig. 3 is a section taken on line 3—3 of Fig. 2. Fig. 4 is a plan view of the tool holding and clamping member.

In carrying out my improved invention, I employ a shank A which is adapted to be secured to an ordinary planing machine and is provided with an apertured end through which extends the stem B' of the head B which is adapted to be clamped against the face of the shank A by a nut $B^2$ working on the threaded end of the stem B' in such a manner that the head B can be adjusted to any angle desired and locked in such a manner that all danger of the same turning in any way is prevented. It will be seen that by this construction by loosening the nut $B^2$ the head can be turned with respect to the shank in order that the tool holding member carried thereby which will be later described can be swung so as to bring the tool into any desired position.

The head B is provided with a transverse rib $B^3$ over which is arranged the bifurcated portion C' of a block C which is pivotally mounted thereon by a pivot pin $C^2$ so that the block can swing on the same in order that a tool carried thereby will be thrown out of engagement with the material being operated upon, on the return stroke of the same.

The block C is provided with a stem $C^3$ on which is mounted a serrated washer D so as to prevent the same from turning thereon and mounted on the stem $C^3$ is a tool holding member E which is provided with converging tool receiving slots F and G and a cut away portion H adapted to receive a tool so that the same will be forced up against the serrations of the washer in order to prevent the same from slipping therein. The tool holding member E is clamped in position on the stem by a nut I working on the threaded outer end of the stem $C^3$ so that by tightening the nut the tool holding member E in which a tool has been placed will be clamped up against the washer in such a manner that the tool will be securely clamped without any danger of the same slipping and at the same time the tool holder will be held in such a manner that all danger of the same rotating on the stem is prevented.

By constructing a tool holder with a hinged block which is allowed to swing when traveling in one direction and to form a positive lock when traveling in the reverse direction a tool carried thereby will make a cut on its forward stroke, and can be thrown out of engagement on its rear stroke. It will also be seen that by constructing the tool holder with grooves and cut-away portions to receive the tools any size tool can be readily placed therein and by adjusting the tool holder so as to bring the slot desired to be used at the proper place a tool can be adjusted so as to extend at any angle from the holder desired.

What I claim is:—

A tool holder comprising a shank having an aperture at its outer end, a head having a stem extending through said shank, the upper end of said stem being threaded to receive a nut, a transverse rib arranged upon said head having an aperture adjacent one end thereof, a block having a groove adapted to receive the transverse rib and a pivot pin adapted to pass through said block and through the aperture of the transverse rib, a stem projecting from said block, a serrated washer arranged thereon, and a tool holding member arranged upon said stem and a nut for securing the same thereon, said tool holding member having converging tool receiving slots, and a cut-away portion, said slots and cut-away portions being continuous to the serrated face of the washer, substantially as and for the purpose described.

ALBERT SHERIFF.

Witnesses:
A. E. STRICKLETT,
JOHN SHERIFF.

Copies of this patent may be obtained for five cents each, by addressing the "Commissioner of Patents, Washington, D. C."